United States Patent [19]
Eberle et al.

[11] Patent Number: 5,701,738
[45] Date of Patent: Dec. 30, 1997

[54] MECHANICAL DISCONNECT FOR VARIABLE SPEED HYDROSTATIC TRANSMISSION

[75] Inventors: Frederick P. Eberle; Norman E. Jolliff, both of Salem, Ind.

[73] Assignee: Tecumseh Products Company, Tecumseh, Mich.

[21] Appl. No.: 685,683

[22] Filed: Jul. 24, 1996

Related U.S. Application Data

[60] Provisional application No. 60/005,241, Oct. 12, 1995.
[51] Int. Cl.$^6$ ............................. F16D 31/02; B60K 41/22
[52] U.S. Cl. ............................. 60/435; 60/487; 192/3.51
[58] Field of Search ................... 60/435, 487; 192/69.9, 192/71, 3.51

[56] References Cited

U.S. PATENT DOCUMENTS

| | | | |
|---|---|---|---|
| 3,058,558 | 10/1962 | Hawk | 192/69.9 |
| 3,241,319 | 3/1966 | Andrews | 60/53 |
| 3,272,276 | 9/1966 | Budzich | 180/44 |
| 3,430,438 | 3/1969 | Weiss | 60/53 |
| 3,504,776 | 4/1970 | Misenti | 192/69.9 X |
| 3,563,352 | 2/1971 | Stibbe | 192/3.5 |
| 4,489,623 | 12/1984 | Hakkenberg | 74/378 |
| 4,914,907 | 4/1990 | Okada | 60/487 |
| 4,979,583 | 12/1990 | Thoma et al. | 180/62 |
| 5,373,697 | 12/1994 | Jolliff et al. | 60/454 |
| 5,392,603 | 2/1995 | Havens et al. | 60/487 X |

*Primary Examiner*—Hoang Nguyen
*Attorney, Agent, or Firm*—Baker & Daniels

[57] ABSTRACT

A mechanical disconnection mechanism for a hydrostatic transmission. The output shaft of the hydrostatic transmission is divided into a drive portion and a driven portion, with both the drive portion and the driven portion being provided with external splines or gears. To connect the drive portion to the driven portion, a splined sleeve is positioned to engage the splines of both the driven portion and the drive portion such that rotation of the drive portion rotates the driven portion. To disconnect the drive portion from the driven portion, the splined sleeve is positioned to engage only one of the drive portion and the driven portion. In the disconnected position, the implement may be manually pushed without reverse driving the hydraulic unit of the transmission to thereby allow for relatively easy movement. A brake is mounted about the driven portion of the output shaft to enable the vehicle to be stopped regardless of the position of the splined sleeve.

18 Claims, 3 Drawing Sheets

MECHANICAL DISCONNECT FOR VARIABLE SPEED HYDROSTATIC TRANSMISSION

CROSS-REFERENCE TO RELATED APPLICATION

This application claims the benefit under Title 35, U.S.C. §119(e) of U.S. Provisional patent application Ser. No. 60/005,241, entitled MECHANICAL DISCONNECT FOR VST HYDROSTATIC TRANSMISSION, filed on Oct. 12, 1995.

BACKGROUND OF THE INVENTION

1. Field of the invention

The present invention generally relates to hydrostatic transmissions and, more particularly, relates to disengagement mechanisms for hydrostatic transmissions.

2. Description of the related art

Hydrostatic transmissions transmit rotary mechanical motion, typically from an internal combustion engine, to fluid motion, then back to rotary mechanical motion to rotate a drive axle in order to drive a vehicle, such as a lawn and garden tractor. By varying the fluid pressure, the hydrostatic transmission can regulate the output rotary mechanical motion such that varying output speeds in the forward and reverse directions are possible with a single speed engine. A radial piston type hydrostatic transaxle is disclosed in U.S. Pat. No. 5,373,697, entitled HYDRAULIC FLUID SYSTEM AND DUMP VALVE MECHANISM FOR A HYDROSTATIC TRANSAXLE, which is specifically incorporated by reference herein.

One common application of a hydrostatic transmission is within a riding lawn mower. Although lawnmowers are self-propelled, in many situations such as positioning the mower within a garage, or a retail sales space, it is necessary to manually push the mower. Hydraulic transmissions, however, present a special problem when the vehicle is to be manually moved. With gear transmissions, a neutral position is achieved by mechanically disengaging the input shaft from the output shaft by either disengaging the gears coupling the input shaft to the output shaft, or disengaging the output shaft from the gears. Thus it is possible to manually move the vehicle without resistance from the transmission system either from the output shaft or input shafts as they are disengaged from one another.

Unlike gear transmissions however, in a hydraulic transmission, the hydraulic motor forming part of the hydrostatic unit and its output remain hydraulically engaged with the fluid pump of the transmission even when in a neutral position and thereby presents substantial resistance to movement. Thus, when trying to push a vehicle having a hydrostatic transmission, even when in neutral, the output acts as the input, and consequently the motor will attempt to pump hydraulic fluid back towards the pump. This problem is accentuated under cold temperature conditions because the hydraulic fluid will become especially viscous.

U.S. Pat. No. 5,373,697 discloses a hydrostatic transmission with a disengagement mechanism which opens check valves within the hydrostatic transmission to thereby short-circuit passages which connect the hydraulic pump and motor. The hydraulic fluid will therefore not be pumped back into the pump. This type of disengaging mechanism is often termed a "relief" valve or "dump" valve since it relieves or dumps the hydraulic fluid from the fluid conduit connecting the pump and the motor into the chamber surrounding the hydrostatic transmission within the hydrostatic transaxle housing.

Although such "dump valves" open valves so that hydraulic fluid can move from the motor side to the pump side, the fluid is somewhat viscous and moves from one side to the other slowly and with difficulty. This is especially a problem under cold conditions when the viscosity of the hydraulic fluid increases significantly.

SUMMARY OF THE INVENTION

The present invention addresses the above-identified needs by providing a mechanical disconnect between the mechanical gear train or differential side of the transmission, and the hydrostatic side whereby rotation of the wheels and the output gearing will not reverse rotate the hydrostatic unit. This disconnect can be used when the lawn and garden implement is being manually pushed to allow for relatively easy movement.

The present invention comprises a hydrostatic transmission having an output shaft wherein the output shaft is divided into a drive portion and a driven portion. The drive portion is connected to the motive producing element of the implement. The drive portion, in turn, is adapted to be connected to or disconnected from the driven portion, with the driven portion then being connected to the wheels or other means for providing locomotion to the implement. The drive portion and the driven portion are connected, or conversely disconnected, by the aforementioned mechanical disconnect.

When it is desired for the implement to be driven, the mechanical disconnect may be positioned such that it connects the drive portion to the driven portion. Alternatively, when it is desired to manually push the implement, the mechanical disconnect can be positioned such that the drive portion is no longer connected to the driven portion. The drive portion and the driven portion are in axial alignment and positioned such that one may be piloted within the other and rotate relative to each other.

The present invention also provides a brake, such as a disc brake, which is fixed to the driven portion of the output shaft. Therefore, even if the drive portion is disconnected from the driven portion, the operator of the vehicle will be able to stop the vehicle by applying the disc brake.

One advantage of the present invention is that the mechanical disconnect allows for relatively easy manual pushing of the vehicle by bypassing the hydraulic unit and avoiding reverse loading of the hydraulic motor and pump.

Another advantage of the present invention is that the vehicle will be able to stop whether the output shaft is connected or disconnected.

The present invention, in one form thereof, provides a hydrostatic transmission which includes a hydraulic unit, an output shaft and a selectively engageable disconnection mechanism. The hydraulic unit includes a pump, a motor, and a hydraulic passage communicating hydraulic fluid between the pump and the motor. The output shaft is coupled to the hydraulic unit and includes a drive portion and a driven portion wherein the driven portion is independent of the drive portion. The disconnection mechanism is adjacent the output shaft and connects the drive portion to the driven portion when engaged, and disconnects the drive portion from the driven portion when disengaged. The driven portion is rotatable without resistance from the hydraulic unit when the disconnection mechanism is disengaged.

The present invention, in another form thereof, provides a hydrostatic transmission comprising a hydraulic unit, an output shaft, at least one axle, and a selectively engageable disconnection mechanism. The hydraulic unit includes a pump, a motor, and a hydraulic passage communicating hydraulic fluid between the pump and the motor. The output shaft is coupled to the hydraulic unit, and has a drive portion and a driven portion wherein the driven portion is independent of the drive portion. The axle is provided to propel a vehicle, with the driven portion beings coupled to the at least one axle through a succession of gears such that rotation of the driven portion causes rotation of the at least one axle. The disconnection mechanism is disposed adjacent the output shaft and connects the drive portion to the driven portion when engaged and disconnects the drive portion from the driven portion when disengaged. The axle and the driven portion rotate independently of the drive portion and the hydraulic unit when the transmission is disengaged.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, and such exemplification is not to be construed as limiting the scope of the invention in any manner.

DETAILED DESCRIPTION OF THE INVENTION

Figure 1:
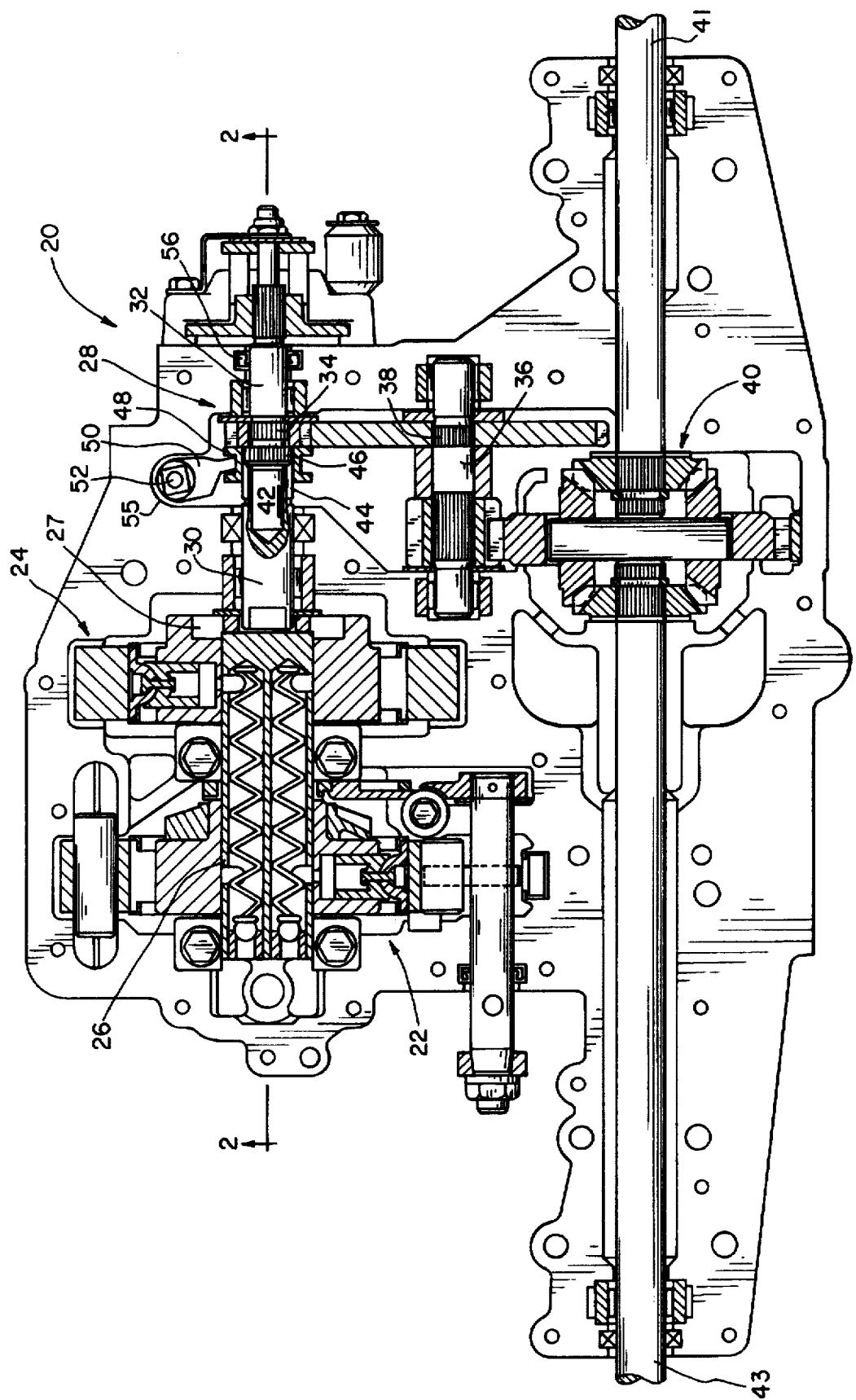
FIG. 1 is a sectional view of a hydrostatic transaxle having an output shaft and disconnect member according to the present invention.

Referring now to the drawings, and particularly to FIG. 1, there is shown a hydrostatic transaxle 20 in accordance with the principles of the present invention and similar in basic construction and operation to the transaxle disclosed in the aforementioned U.S. Pat. No. 5,373,697.

Hydrostatic transaxle 20 includes a pump 22 and a motor 24 for transferring rotary motion from an energy source such as an internal combustion engine (not shown) to the drive wheels of a vehicle (not shown) in which the hydrostatic transaxle 20 is installed. Pump 22 drives motor 24 wherein both pump 22 and motor 24 are mounted on a fixed hydraulic passage in the form of pintle 26.

The drive wheels (not shown) are drivingly connected to the hydrostatic transaxle 20 through a succession of gears beginning with an output member 27 axially connected to motor 24 so as to rotate therewith. Output member 27 is drivingly connected to an output shaft 28 which in turn is connected to transfer shaft 36. Output gear 34 of output shaft 28 is connected to transfer gear 38 of transfer shaft 36 to rotate transfer shaft 36 when output shaft 28 is rotated. Transfer shaft 36 is then connected to differential mechanism 40 which in turn provides locomotion to a vehicle via axles 41 and 43.

Figure 4A:
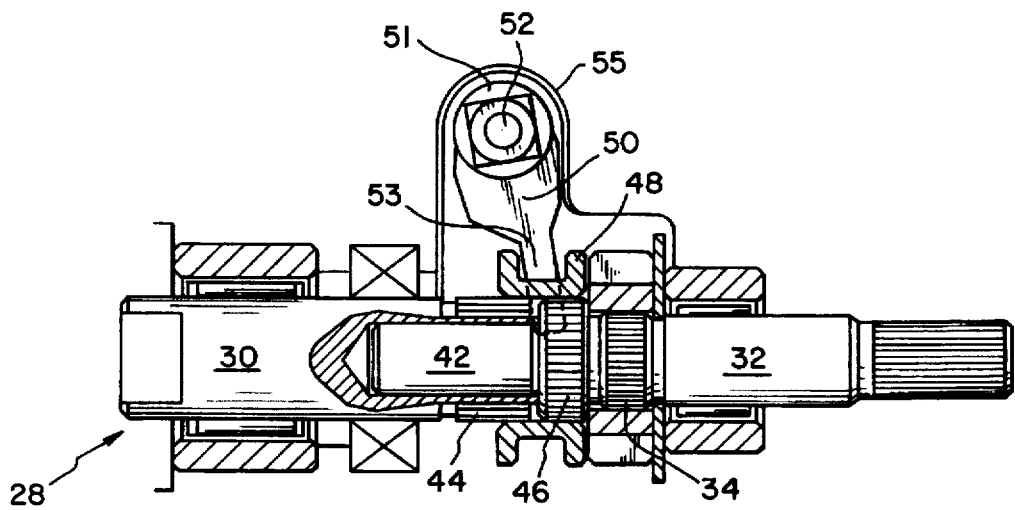
FIG. 4A is a sectional view of the output shaft and disconnect member in the connected position.
Figure 4B:
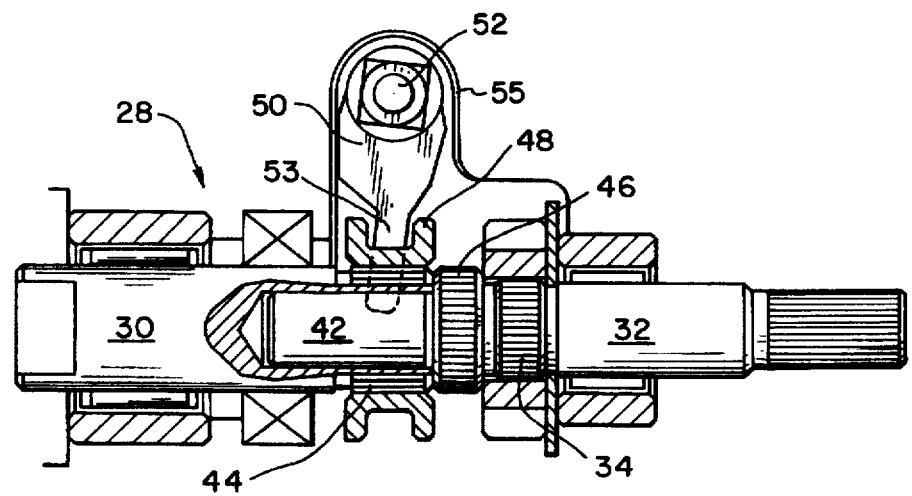
FIG. 4B is a sectional view of the output shaft and disconnect member in the disconnected position.

As best shown in FIGS. 4A and 4B, output shaft 28 is divided into a drive portion 30 and driven portion 32. Mating end 42 of driven portion 32 has a smaller diameter than the inner diameter of drive portion 30. Driven portion 32 can therefore be piloted within drive portion 30 so that when output shaft 28 is connected both drive portion 30 and driven portion 32 rotate simultaneously and when disconnected, independent rotation of portions 30 and 32 is possible. Drive portion 30 and driven portion 32 can be connected and disconnected through internally splined sleeve 48 which meshes with splines 44 and 46 on drive portion 30 and driven portion 32, respectively. In the position shown in FIG. 4A, when drive portion 30 is rotating, spline sleeve 48 also rotates and in turn causes driven portion 32 to rotate. This configuration would be the typical positioning of the invention during normal operation of the vehicle. FIG. 1 shows seal 56 mounted about driven portion 32 to prevent leakage of fluids outside hydrostatic transaxle 20.

Once it is desired for drive portion 30 to be disconnected from driven portion 32, as when it is desired for the implement to be manually pushed, spline sleeve 48 may be axially positioned to the left as is shown in FIG. 4B. This repositioning of spline sleeve 48 is accomplished through disconnect lever 50.

Figure 3:
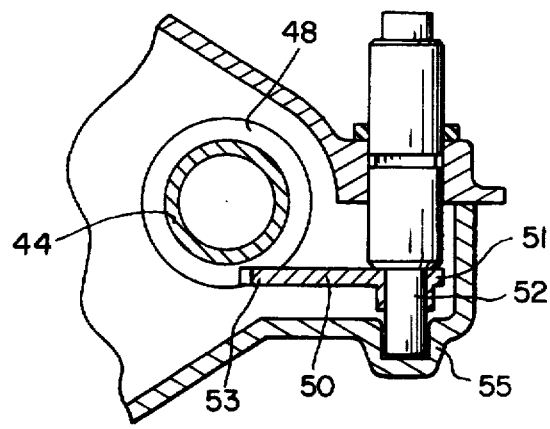
FIG. 3 is a side sectional view of the output shaft and disconnect member.

Disconnect lever 50 is comprised of two ends. As shown in FIG. 3, swivel end 51 is rotatably driven by shaft 52 and is mounted about drive portion 30. Sleeve end 53 is connected to spline sleeve 48. When sleeve end 53 is rotated clockwise about swivel end 51, spline sleeve 48 moves axially to the left (FIG. 4B) and disengages from splines 46. This in turn disengages drive portion 30 from driven portion 32.

When it is desired again to couple drive portion 30 to driven portion 32, spline sleeve 48 may be moved axially to the right by rotating disconnect lever 50 counterclockwise. As best shown in FIGS. 4A and 4B, disconnect lever 50 is only able to rotate a small distance about swivel end 51. Housing 55 and the angled shaping of disconnect lever 50 combine to so limit the movement. It is advantageous to have a limited range of motion for disconnect lever 50 so that the operator cannot over rotate lever 50 and damage the output shaft or gearing.

In use, the present invention may be installed in a lawn and garden implement, typically a riding lawnmower. As stated above, an output shaft 28 is provided and is divided into a drive portion 30 and a driven portion 32. When an operator desires to use the implement in a driven fashion, disconnect lever 50 is positioned such that spline sleeve 48 is connected to both drive portion 30 and driven portion 32. If the operator desires to manually push the implement, disconnect lever 50 may be rotated clockwise so that spline sleeve 48 is no longer connected to driven portion 32, but instead is connected only to drive portion 30. In other embodiments, output shaft 28 may be disconnected by positioning sleeve 48 such that sleeve 48 only engages driven portion 32. Disconnect lever 50 may be continuously rotated from the connected position to the disconnected position throughout the operation of the implement.

In order to stop and slow the implement when the present invention is in its disconnected position, disc brake assembly 60 is provided adjacent driven portion 32. Since a mechanical disconnect could potentially allow the output gearing to be disconnected from the hydrostatic transmission while the vehicle is in use and thereby cause the gearing to freewheel and prevent the user from stopping the vehicle, disc brake assembly 60 is fixed to, or integral with, driven portion 32. Therefore, regardless of the position of disconnect lever 50, disc brake assembly 60 can slow driven portion 32 and therefore the entire implement.

Figure 2:
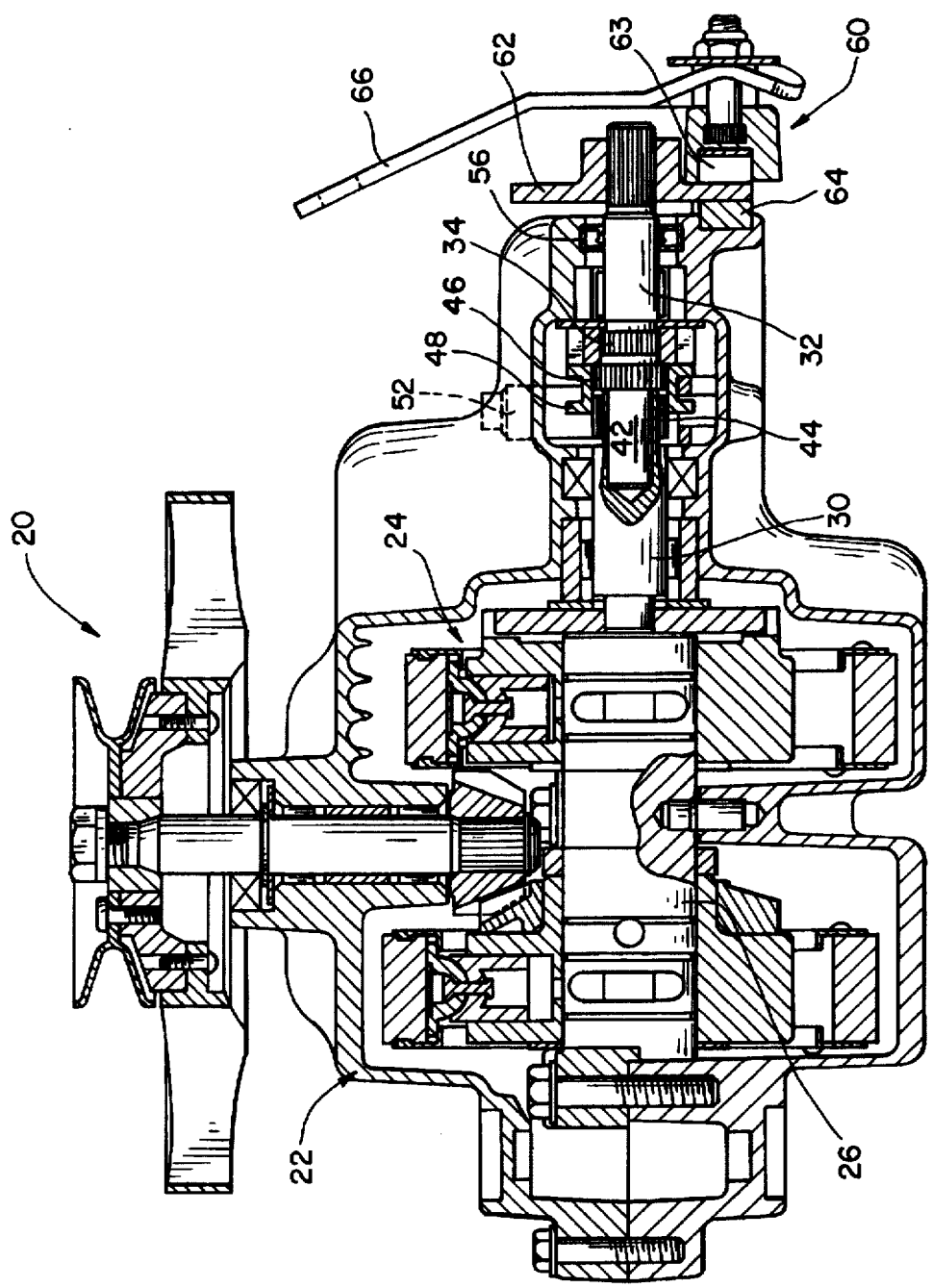
FIG. 2 is a sectional view of the embodiment shown in FIG. 1 taken along the line B—B.

As best depicted in FIG. 2, disc brake assembly 60 is comprised of disc 62 which is fixed to, or integral with, driven portion 32 of output shaft 28. One side of brake disc 62 is sandwiched between brake pad 64 and brake shoe 63. When the operator wishes to slow or stop the vehicle, actuating arm 66 is moved such that shoe 63 moves toward pad 64 in the direction of disc 62. As pad 64 and shoe 63 approach each other, the resulting friction with disc 62 slows or stops the rotation of driven portion 32. Since driven portion 32 is connected to transfer shaft 36, which is connected to differential mechanism 40 and eventually the wheels of the vehicle, disc brake assembly 60 is able to stop or slow the vehicle regardless of whether the output shaft is connected or disconnected.

While this invention has been described as having a particular design, the present invention can be further modified within the spirit and scope of this disclosure. This application is therefore intended to cover any variations, uses, or adaptations of the invention using its general principles. Further, the application is intended to cover such departures from the present disclosure as come within known or customary practice in the art to which the invention pertains, and which fall within the limits of the appended claims.

What is claimed is:

1. A hydrostatic transmission for use in lawn and garden implements, comprising:

a hydraulic unit including a pump, a motor, and a hydraulic passage communicating hydraulic fluid between said pump and said motor;

an output shaft coupled to said hydraulic unit, said output shaft having a drive portion and a driven portion, said driven portion being independent of said drive portion;

a shaft brake operably connected to said driven portion, which when engaged stops rotation of said driven portion; and a selectively engageable disconnection mechanism adjacent said output shaft, said disconnection mechanism connecting said drive portion to said driven portion when engaged, and disconnecting said drive portion from said driven portion when disengaged, said driven portion being rotatable without resistance from said hydraulic unit when said disconnection mechanism is disengaged.

2. The hydrostatic transmission of claim 1, wherein said drive portion includes a plurality of splines radially disposed about an external circumference thereof, said driven portion includes a plurality of splines radially disposed about an external circumference thereof, and said disconnection mechanism has an internally splined collar disposed around said output shaft and adapted to engage said driven portion splines and said drive portion splines when engaged, said collar adapted to axially move along said output shaft and disconnect said drive portion splines from said driven portion splines when disengaged.

3. The hydrostatic transmission of claim 2, wherein said driven portion is concentrically piloted within said drive portion.

4. The hydrostatic transmission of claim 1, wherein said driven portion includes an input portion and an output portion, and said shaft brake is connected to said output portion.

5. The hydrostatic transmission of claim 4, wherein said brake includes a disc secured to said driven portion and including a first side and a second side, a shoe disposed on said first side, a pad disposed on said second side, and an actuation mechanism operatively coupled to said shoe and said pad to force said shoe toward said pad to engage said disc therebetween and stop rotation of said driven portion.

6. A hydrostatic transaxle for use in lawn and garden implements, comprising:

a hydraulic unit including a pump, a motor, and a hydraulic passage communicating hydraulic fluid between said pump and said motor;

an output shaft coupled to said hydraulic unit, said output shaft having a drive portion and a driven portion, said driven portion being independent of said drive portion;

a pair of axles for propelling a vehicle, said driven portion being coupled to said axles through a differential mechanism and a gear train including a succession of gears such that rotation of said driven portion causes rotation of said axles;

a shaft brake operably connected to said driven portion and disposed ahead of said differential, which when engaged stops rotation of said driven portion and said gear train; and a selectively engageable disconnection mechanism ahead of said brake and adjacent said output shaft, said disconnection mechanism connecting said drive portion to said driven portion when engaged, and disconnecting said drive portion from said driven portion when disengaged, said axles, gear train and said driven portion rotating independently of said drive portion and said hydraulic unit when said disconnection mechanism is disengaged.

7. The transaxle of claim 6, further including a transfer shaft, said driven portion operably connected to said transfer shaft, said transfer shaft operably connected to said differential mechanism, said differential mechanism operably connected to said axles, rotation of said driven portion causing said transfer shaft to rotate, rotation of said transfer shaft causing said differential mechanism to rotate, rotation of said differential mechanism causing said axles to rotate and thereby provide locomotion to a vehicle employing said transaxle.

8. The transaxle of claim 6, wherein said drive portion includes a plurality of splines radially disposed about an external circumference thereof, said driven portion includes a plurality of splines radially disposed about an external circumference thereof, and said disconnection mechanism has an internally splined collar disposed around said output shaft and adapted to engage said driven portion splines and said drive portion splines when engaged, and adapted to axially move along said output shaft and disconnect said drive portion splines from said driven portion splines when disengaged.

9. The transaxle of claim 8, wherein said driven portion is concentrically piloted within said drive portion.

10. The hydrostatic transaxle of claim 6, wherein said brake is disposed adjacent said driven portion, said brake adapted to engage and stop rotation of said driven portion when said disconnection mechanism is engaged and disengaged.

11. The transaxle of claim 10 wherein said brake includes a disc secured to said driven portion and including a first side and a second side, a shoe disposed on said first side, a pad disposed on said second side, and an actuation mechanism operatively coupled to said shoe and said pad to force said shoe toward said pad to engage said disc therebetween and stop rotation of said driven portion.

12. The hydrostatic transmission of claim 1, wherein said brake is disposed adjacent to said driven portion, said driven portion includes an input portion and an output portion, and said brake is connected to said output portion.

13. The hydrostatic transaxle of claim 6, wherein said brake is disposed ahead of said gear train.

14. The hydrostatic transaxle of claim 10, wherein said drive portion includes an input portion and an output portion, and said brake is connected to said output portion.

15. A hydrostatic transaxle for use in lawn and garden implements, comprising:
  a hydraulic unit including a pump, a motor, and a hydraulic passage communicating hydraulic fluid between said pump and said motor;
  an output shaft coupled to said hydraulic unit,
  a transfer shaft operably coupled between said output shaft and a differential, said transfer shaft having a drive portion and a driven portion, said driven portion being independent of said drive portion; and
  a shaft brake operably connected to said driven portion, which when engaged stops rotation of said driven portion; and
  a selectively engageable disconnection mechanism adjacent said transfer shaft, said disconnection mechanism connecting said drive portion to said driven portion when engaged, and disconnecting said drive portion from said driven portion when disengaged, said driven portion being rotatable without resistance from said hydraulic unit when said disconnection mechanism is disengaged.

16. The hydrostatic transaxle of claim 15, wherein said drive portion includes a plurality of splines radially disposed about an external circumference thereof, said driven portion includes a plurality of splines radially disposed about an external circumference thereof, and said disconnection mechanism is an internally splined collar disposed around said output shaft and adapted to engage said driven portion splines and said drive portion splines when engaged, said collar adapted to axially move along said output shaft and disconnect said drive portion splines from said driven portion splines when disengaged.

17. The hydrostatic transaxle of claim 16, wherein said driven portion is concentrically piloted within said drive portion.

18. The hydrostatic transaxle of claim 15 wherein said brake includes a disc secured to said driven portion and including a first side and a second side, a shoe disposed on said first side, a pad disposed on said second side, and an actuation mechanism operatively coupled to said shoe and said pad to force said shoe toward said pad to engage said disc therebetween and stop rotation of said driven portion.

* * * * *